UNITED STATES PATENT OFFICE 2,350,165

CADMIUM PLATING

John A. Henricks, Jr., Detroit, Mich., assignor to The Udylite Corporation, Detroit, Mich., a corporation of Delaware No Drawing. Application July 21, 1939, Serial No. 285,748

4 Claims. (Cl. 204—50)

This invention relates to the production of bright cadmium coatings from cyanide plating baths.

It is an object of this invention to secure a cadmium coating of superior brightness and gloss.

The bright cadmium coatings heretofore obtained have not been as glossy as has sometimes been desired. Bright nickel coatings applied on a highly buffed basis metal cannot be further improved by buffing. The sound cadmium coatings with which I am familiar, however, become more reflective on buffing. Cadmium coatings of sufficient brilliance have been obtained by the use of critical amounts of nickel salts plus highly colloidal additions such as gelatin, but such coatings are brittle and of little use.

I have found that certain resins soluble in the plating bath produce the desired gloss without injuring the mechanical properties of the plate. These resins are thermal decomposition products of the condensation products of sulphamic acid and certain aliphatic aldehydes. The aldehydes should contain double bonds or hydroxyl groups which on dehydration give double bonds. Examples are given in Table 1. Such aldehydes as cinnamaldehyde, $C_6H_5CH=CH \cdot CHO$, benzaldehyde, $C_6H_5 \cdot CHO$, chloral hydrate, $$CCl_3 \cdot CHO \cdot H_2O$$

bromal hydrate, $CBr_3 \cdot CHO \cdot H_2O$ and formaldehyde, $H \cdot CHO$ give unsatisfactory products or no new products at all.

TABLE 1

Croton aldehyde, $CH_3 \cdot CH=CH \cdot CHO$
Aldol, $CH_3 \cdot CH(OH) \cdot CH_2 \cdot CHO$
Paraldol, $(CH_3 \cdot CH(OH) \cdot CH_2 \cdot CHO)_2$
Furfural,

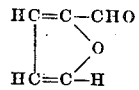

In general, those resins which are prepared with a high molar ratio of sulphamic acid to aldehyde are the most soluble and most effective as brighteners in the cadmium cyanide bath. Also, the rate of reaction is more controllable. These resins are prepared as follows:

Example 1

Pour slowly with thorough mixing 1 mol. croton aldehyde (70 grams) onto 2 mols. sulphamic acid (192 grams). Heat slowly to start the exothermic reaction and then discontinue the heating but continue stirring the mixture. In about 5 to 7 minutes an orange colored taffy-like condensation product has been formed. This product has no value as a brightener. As the stirring is continued the temperature continues to rise and further reaction ensues resulting in a red colored resinous product. This product is not satisfactory for a brightener. The temperature continues to rise slowly until a point is reached when a new reaction takes place which is very strongly exothermic. The whole mass intumesces and turns brown. At this point the mixture is cooled and further reaction prevented. This material is exceedingly active as a brightener. If the temperature was allowed to rise further, the resultant product turns black-brown. It is not as satisfactory a brightener, being less soluble in the plating bath and causing streaks and discoloration in the plate.

Example 2

Substituting 1 mol. of aldol for 1 mol. of croton aldehyde, the same procedure can be followed as outlined in Example 1. The resultant brown product is indistinguishable in effect from that obtained in Example 1.

Example 3

Paraldol can be substituted for aldol. As it is a solid material, the original mixture is prepared dry, which is an advantage from a handling standpoint. This mixture is spread as a layer in the bottom of a container and heated to start the reaction in the same procedure followed as above outlined. The resultant product seems to be identical with that obtained with aldol.

Example 4

The same procedure outlined in Example 1 can be followed. Using 1 mol. of furfural and 2 mols. of sulphamic acid, the reactions tend to be more violent than in Examples 1 to 3. The exothermic reaction starts at a lower temperature, the temperature rises faster and more effective cooling is necessary to stop the reaction when intumescence takes place. The furfural-sulphamic acid product is somewhat less effective, the lustre of the resultant plate being less intense.

Example 5

A smoother reaction is obtained by using a dehydrating agent such as aluminum or zinc chloride. Using 1 mol. of aldol, 2 mols. of sulphamic acid and $\frac{1}{3}$ mol. aluminum chloride mixed and heated in a manner similar to Example 2, the reaction produced a red-brown resin but no intumescence ensued. This resin gave a bright deposit slightly inferior in lustre to Example 2.

The sulphamic acid is a strong acid and as such catalyzes the polymerization of unsaturated aldehydes if it is given the opportunity. The polymerized aldehydes are not effective brighteners and may be harmful in the plating bath. This formation is avoided by the use of a molar ratio of sulphamic acid to aldehyde of above 1:1 and by staying away from solvents such as water in which the sulphamic acid can ionize. It may also be possible to block off the carbonyl group to inhibit the aldehyde polymerization until the preliminary sulphamic condensation has taken place, thereby allowing a lower molar ratio of sulphamic acid to aldehyde.

Higher molar ratios of sulphamic acid to aldehyde may be used. However they are not particularly desirable. The materials made with a 3:1 ratio are slightly less effective on an equal weight basis. With a 4:1 ratio there is some free sulphamic acid left unreacted in the final product. Free sulphamic acid or its salts do not act as brighteners.

The amount of brightener required varies somewhat with the metal content of the plating bath, the thickness of plate deposited and the composition of the brightener. In a bath containing 2½ oz./gal. of cadmium and 8 oz./gal. of free sodium cyanide the following amounts are required for .0002″ and .0010″ plate:

|  | In oz./gal., concentration to give plate thickness of— | |
| --- | --- | --- |
|  | .0002″ | .0010″ |
| Sulphamic acid reaction product of— | | |
| Crotonaldehyde | ⅛ | 1/16 |
| Aldol | ⅛ | 1/16 |
| Paraldol | ⅛ | 1/16 |
| Furfural | ¼ | ⅛ |

If ⅛ oz./gal. of the paraldol reaction product is used to plate .0010″ thick coatings, a ridged plate results unless agitation is resorted to. If 1/16 oz./gal. is used to plate .0002″ coatings the lustre is deficient in intensity.

When the metal content is increased from 2½ to 5 oz./gal. approximately 50% more brightener is required for the same lustre.

The "brightener activators" disclosed in my co-pending application Serial No. 285,749, filed July 21, 1939, and in particular the carbon disulphide-amine reaction products such as mercapto-benzothiazole frequently have a beneficial effect when added to cadmium cyanide baths containing sulphamic acid-aldehyde reaction products, eliminating aging of the bath and maintaining the ability of the bath to produce bright plate over a long period of time.

It was also found that while an excess of the sulphamic acid-paraldol reaction product such as 1 oz./gal. caused a drop in efficiency and extensive burning, the burning was removed and the efficiency partially restored on the addition of as little as ⅛ oz./gal. of mercapto-benzothiazole.

I claim:

1. A cadmium cyanide plating solution containing a brown resin which is the thermal decomposition product of the condensation product of sulphamic acid and an aldehyde from the group consisting of croton aldehyde, aldol, paraldol and furfural and where the thermal decomposition is arrested before black appears in said thermal decomposition product.

2. A cadmium cyanide plating solution containing a brown resin which is the thermal decomposition product of the condensation product of sulphamic acid and an aldehyde from the group consisting of croton aldehyde, aldol, paraldol and furfural with a molar ratio between sulphamic acid and aldehyde greater than 1 and less than 4 and where the thermal decomposition is arrested before black appears in said thermal decomposition product.

3. A method for the electrodeposition of bright cadmium comprising electrodepositing cadmium from a cadmium cyanide plating solution containing a brown resin which is the thermal decomposition product of the condensation product of sulphamic acid and an aldehyde from the group consisting of croton aldehyde, aldol, paraldol and furfural and where the thermal decomposition is arrested before black appears in said thermal decomposition product.

4. A method for the electrodeposition of bright cadmium comprising electrodepositing cadmium from a cadmium cyanide plating solution containing a brown resin which is the thermal decomposition product of the condensation product of sulphamic acid and an aldehyde from the group consisting of croton aldehyde, aldol, paraldol and furfural with a molar ratio between sulphamic acid and aldehyde greater than 1 and less than 4 and where the thermal decomposition is arrested before black appears in said thermal decomposition product.

JOHN A. HENRICKS, JR.